United States Patent
Beyda et al.

(10) Patent No.: US 7,463,731 B2
(45) Date of Patent: Dec. 9, 2008

(54) APPARATUS AND METHOD FOR DUAL MODE PHONE

(75) Inventors: William J. Beyda, Cupertino, CA (US); Florin Gheorghiu, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 827 days.

(21) Appl. No.: 10/655,960

(22) Filed: Sep. 5, 2003

(65) Prior Publication Data

US 2005/0053051 A1    Mar. 10, 2005

(51) Int. Cl.
*H04M 1/02*    (2006.01)
(52) U.S. Cl. .................. 379/387.02; 370/353; 370/494; 455/445
(58) Field of Classification Search ............. 379/387.02, 379/399.01; 370/447, 352, 494; 455/445
See application file for complete search history.

(56) References Cited

U.S. PATENT DOCUMENTS

| | | | | |
|---|---|---|---|---|
| 6,614,786 | B1* | 9/2003 | Byers | 370/353 |
| 6,741,835 | B2* | 5/2004 | Pulver | 455/3.05 |
| 6,956,943 | B1* | 10/2005 | Goodrich, II et al. | 379/399.01 |
| 7,257,126 | B2* | 8/2007 | Hirano et al. | 370/447 |
| 7,352,856 | B2* | 4/2008 | Matsuhashi et al. | 379/387.02 |
| 2007/0047730 | A1* | 3/2007 | Bremer et al. | 379/399.01 |

* cited by examiner

*Primary Examiner*—Gerald Gauthier

(57) ABSTRACT

A dual mode packet phone is provided, comprising a first connector to connect the phone with a data network, and a second connector to connect the phone with a backup network. The phone automatically switches between the data and backup networks in the event that the data network fails to process the call in a timely manner. In a preferred embodiment, the phone is a Voice-over-IP phone, and comprises a voice processing unit, a control unit, a line interface, a data network interface, and a backup switch.

16 Claims, 3 Drawing Sheets

APPARATUS AND METHOD FOR DUAL MODE PHONE

BACKGROUND OF THE INVENTION

Voice-over-Internet-Protocol telephones (sometimes referred to as Voice-over-IP or VoIP phones) provide long-distance voice communications at much lower cost than traditional telephones (sometimes referred to as Plain Old Telephone Service or POTS). Moreover, VoIP phones offer the possibility of conveniently integrating the computer and telephone desktop environment of employees, with the potential to boost employee productivity. Accordingly, increasing numbers of business enterprises are integrating their data and telephone systems by migrating to VoIP phones.

While this migration offers business enterprises substantial savings, increased employee productivity, and convenience, the potential exists for disruptions to the data network. Such disruptions could be the product of computer viruses, power failures, server failures, or temporary overload of network bandwidth.

To safeguard against such disruptions, many enterprises deploy POTS as well as VoIP phones in various locations. However, one drawback of having different types of phones in an enterprise is that users can be confused by, or fail to appreciate, the different user interfaces presented by such different phone types in a single business environment. Another drawback is the cost impact of purchasing two sets of phone devices.

SUMMARY OF THE INVENTION

While this Summary of the Invention is intended to provide a context for appreciating the discussion of the Detailed Description of preferred embodiments below, it is not intended to limit the scope of the invention. Rather, the invention is limited only by the scope of the appended claims, including both their literal wording and all equivalents thereto.

The present invention is directed to recognizing and meeting the need that exists for a phone that presents a single user interface and offers the user voice packet service, such as VoIP service, in a first mode of operation, and a backup service if the packet service is unavailable.

Therefore, according to one aspect of the invention, a dual mode packet telephone comprises a first connector to connect the phone with a data network; and a second connector to connect the phone with a backup network. The phone is preferably a VoIP phone.

In one embodiment, the backup network is an analog network. In both normal and backup modes of operation, access can be provided through a Bypass Unit (or, alternatively, PBX or Key System) to a Public Network, such as the PSTN or the Internet. In the bypass mode of operation, the bypass unit senses the off-hook condition coming from the phone over an analog line. The bypass unit throws a relay to connect the analog line to the trunk. In a normal mode of operation, the calls can flow directly from the analog line of the data gateway, through the bypass unit and to the analog trunk to a public network, such as the public switching telephone network (PSTN).

In a different embodiment, the backup network is a digital, time division-multiplexing (TDM), network. In both normal and backup modes of operation, access can be provided through a PBX to a Public Network, such as the PSTN or the Internet. In backup mode, the phone automatically switches out of IP mode into digital time division multiplexing mode. This is particularly convenient for companies replacing TDM switches with IP phones, as they can use their existing TDM switch as a backup, in case of problems on the data network.

In alternatives to the above-described embodiments, separate dedicated external lines can be provided for each of the normal and backup modes.

BRIEF DESCRIPTION OF THE DRAWINGS

The nature, advantages and various features of preferred embodiments of the invention will be more fully understood in connection with the detailed descriptions read together with accompanying drawings.

FIG. 1 generally shows a dual mode packet phone used according to a first embodiment of the present invention.

FIG. 2 generally shows a dual mode packet phone used according to a second embodiment of the present invention.

DETAILED DESCRIPTION OF THE PREFERRED EMBODIMENTS

The following Detailed Description of Preferred Embodiments is intended to be illustrative and not limiting, as the scope of the invention is intended to be commensurate with the full breadth of the appended claims, including all equivalents thereto. Moreover, the features and preferred embodiments described herein can be used separately, or in combination, in various embodiments of the invention.

The phones of the present invention offer the advantages of packet transmission, preferably voice-over-IP transmission (e.g., low cost and high convenience), without the risks of loss of service due to data network failures. While the primary mode of operation of the phones described herein is data-network based, and most preferably Voice-over-IP based, other data-network systems would be within the scope of the invention. A backup mode of operation of the same phones preserves the ability to communicate in the event of a failure of the data network supporting the primary mode of operation. In general terms, the embodiments of FIG. 1 provide digital backup networks, while the embodiments of FIG. 2 provide analog backup networks, but elements from one Figure can be mixed and matched with elements from the other. A preferred architecture of the phones themselves is described in connection with FIG. 3. These phones are typically used in a Local Area Network (LAN) environment, where one or more servers 1000 is/are in communication with the LAN and the phone(s).

Turning now to the drawings, FIG. 1 shows a dual mode packet phone 100 with a data connector, such as an RJ-45

Ethernet connector, and backup network connector, such as an RJ-11 connector. For the purposes of this invention, a "dual mode packet phone" is a phone that has at least one mode of operation in which transmitted voice information is assembled into digital packets and received voice information is assembled from digital packets. The specific RJ-45 and RJ-11 connectors are shown for convenience as the type of connectors that would typically be used for connecting, respectively, to the Ethernet (typically an Intranet in the context of this invention), and to a digital line, such as an ISDN line, directed through to a PBX (which is in turn connected to a Public Network such as the PSTN). However, in other embodiments of the invention, the dual mode phone 100 could instead be connected to other data networks for its normal packet-based mode of operation, such as networks carrying Token Ring, Fiber Channel, or other Local Area Network protocols, or other data protocols that may arise in the future for packet-based transmission/reception of voice data.

Figure 1A:
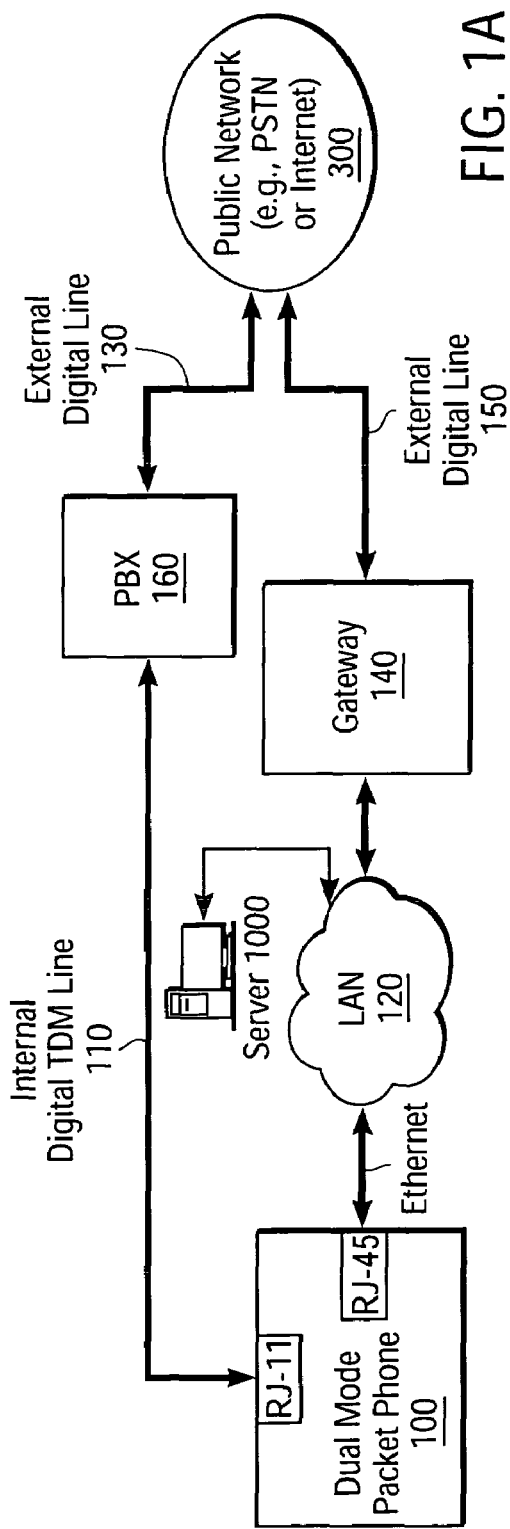
FIG. 1a is a block diagram depicting a dual mode phone having a normal mode of operation to a Public Network through a LAN and a Gateway, a backup mode of operation to the Public Network through a PBX, and a dedicated communication link for each of the two modes of operation.
Figure 1B:
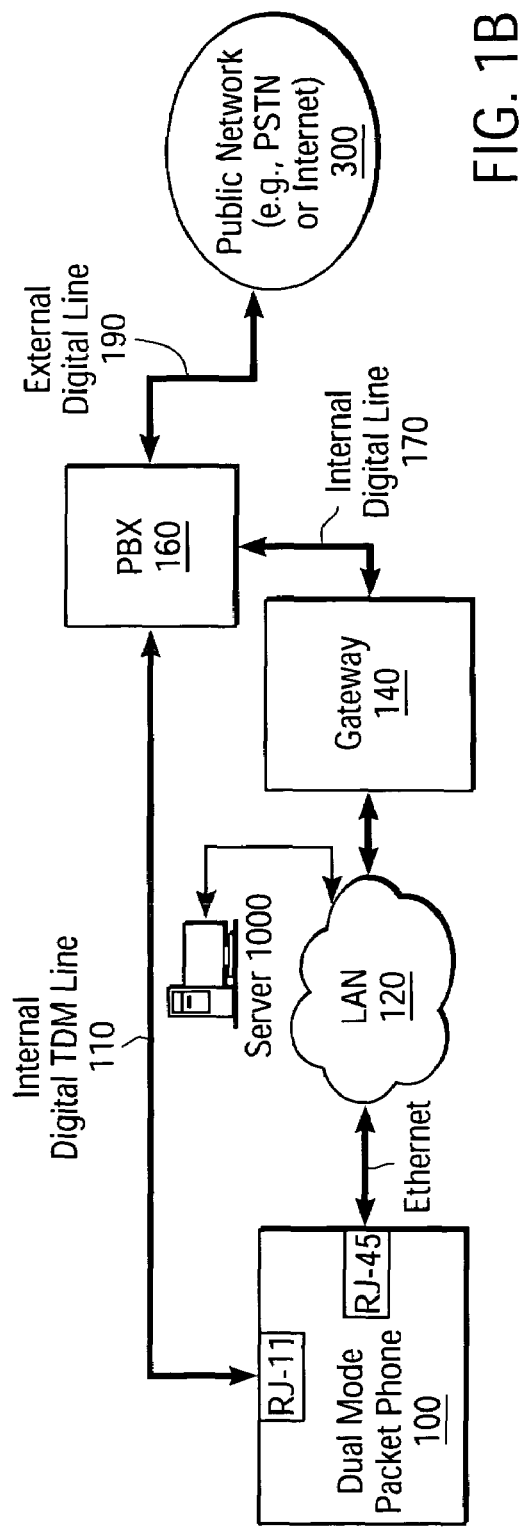
In FIG. 1b, the output of the Gateway is directed through the PBX, so that the same digital communication link is used in both normal and backup modes of operation to reach the Public Network.

In the normal mode of operation in both FIGS. 1*a* and 1*b*, information from the RJ-45 connection is routed through the Ethernet LAN 120, to a Gateway 140, and ultimately to a Public Network 300. The Public Network 300 can be, for example, either a PSTN or the Internet, or any other network that generally serves the public (as opposed to the customer's internal data and/or telephone networks).

However, in the event of a disruption in the LAN 120, such as can be caused by a virus, a power failure, or insufficient bandwidth due to use overload, the phone will operate in a bypass mode. In the bypass mode of operation, information from the RJ-11 connection is routed to a company's/enterprise's PBX 160 via a first internal digital line 110, using, for example, TDM, with any open-standard or proprietary protocol. Some protocols that could be used include, but are not limited to, ISDN, Optiset, RolmLink, Nortel, and Avaya protocols. It is particularly economical and convenient to retain the company's prior PBX system and protocols in place as the backup system to be used in connection with the phones of this invention.

In the embodiment of FIG. 1*a*, a first dedicated external digital line 130 provides a communication link between the PBX 160 and the Public Network 300, and a second dedicated external digital line 150 provides a communication link between the Gateway 140 and the Public Network 300.

In the embodiment of FIG. 1*b*, a second internal digital line 170 connects the Gateway 140 to the PBX 160. Accordingly, whether the phone 100 is in normal or backup mode, the data passes from PBX 160 through to the Public Network 300 via a single external digital line 190. This has the advantage of keeping the recurring external digital line costs down, as compared with the embodiment of FIG. 1*a*, which requires twice the external digital line costs.

To augment flexibility to an enterprise adopting a dual mode packet phone system according to this embodiment, all the phones of this class in an enterprise could be enabled for TDM backup, irrespective of whether or not they are connected to the TDM network. These dual mode phones would be able to automatically sense the TDM presence, and only would only attempt to switch to TDM if a TDM connection were present. This would be particularly useful for providing different classes of service to different employees or building locations. For example, it might be considered that all conference rooms and executive offices should have the dual-mode capability, so as to guarantee uninterrupted phone service in cases of emergencies, but that pre-existing PBX system is not large enough to provide backup service to all the phones.

Figure 2A:
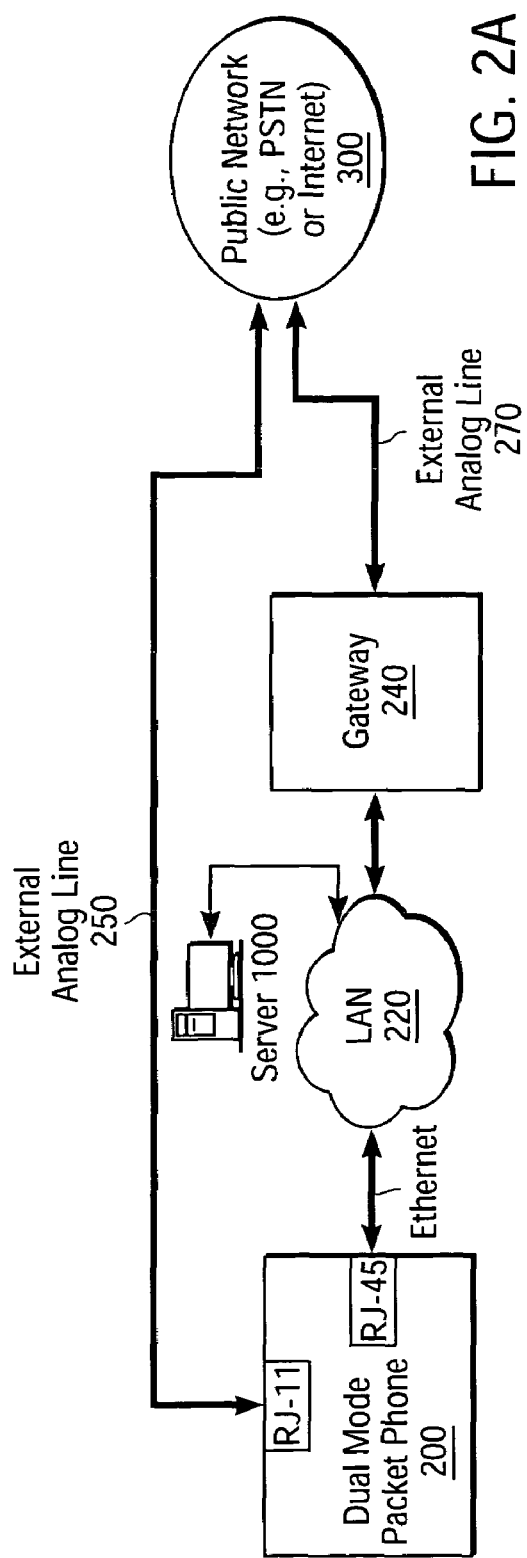
FIG. 2a is a block diagram depicting a dual mode phone having a normal mode of operation to a Public Network through a LAN and a Gateway, and a backup mode of operation to a Public Network via a second analog line in communication with the Public Network.
Figure 2B:
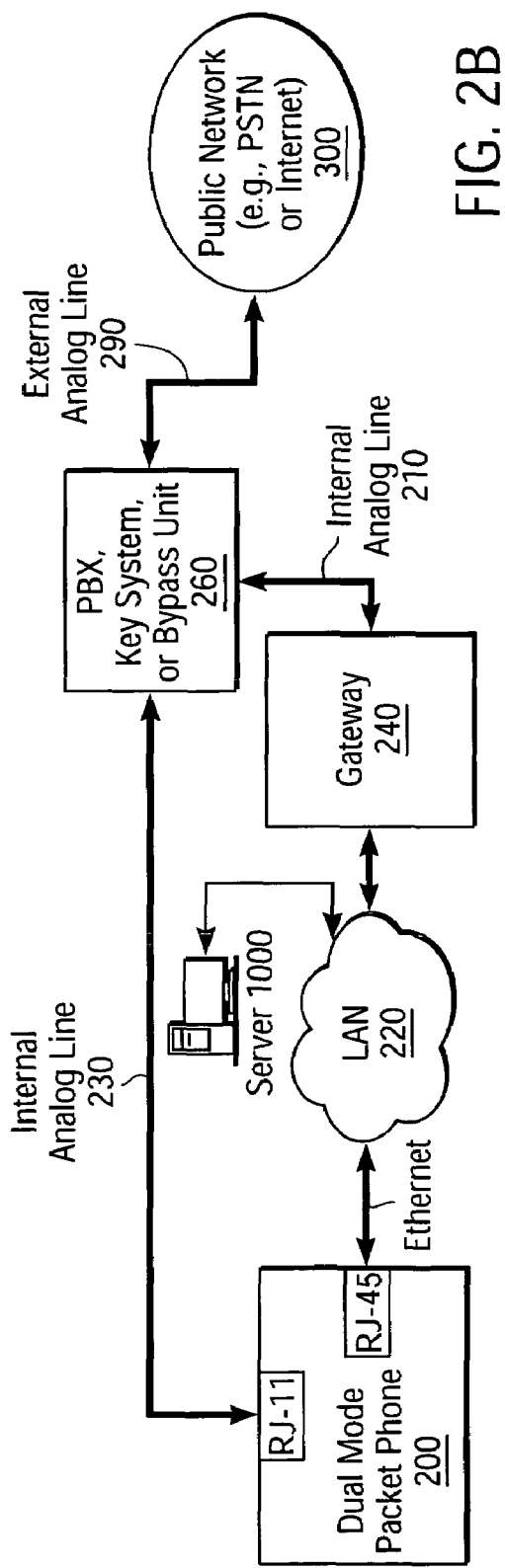
In FIG. 2b, the output of the Gateway is directed through a Bypass Unit, so that the same analog communication link is used in both normal and backup modes of operation.

The embodiments of FIG. 2 are most likely to be used when a customer does not have a pre-existing PBX system with a TDM network available as a backup. In such cases, the backup system can simply be an additional external analog line 250, connecting the RJ-11 jack of dual mode packet phone 200 with the Public Network 300, as shown in FIG. 2*a*. The primary mode of operation uses the Ethernet LAN 220 and the Gateway 240, as before, with a second external analog line 270 providing the communication between the Gateway 240 and the Public Network 300. Alternatively, as shown in FIG. 2*b*, in the primary mode, a first internal analog line 210 (gateway analog line) takes the data from the Gateway 240 to the Bypass Unit 260, from where it flows to the Public Network 300. On the other hand, while in the backup mode, a second internal analog line 230 (bypass internal analog line) provides a communication link between the phone 200 and a Bypass Unit 260. In this embodiment, only a single external analog line 290 is needed, keeping the line costs down as compared with the embodiment in FIG. 2*a*.

In the embodiment of FIG. 2*b*, the bypass mode of operation is initiated when Bypass Unit 260 senses an off-hook condition coming from the phone 200 over the second internal analog line 230, indicating that the phone 200 has given up on the data network (e.g., the Ethernet IP LAN) and is trying to place a call on the second internal analog line 230.

In a particularly economical embodiment, pre-existing analog trunks are connected to the Bypass Unit 260, and these are used between the Bypass Unit and the Public Network (in particular, the PSTN), irrespective of whether the dual mode phone 200 is in normal or backup operation mode.

Figure 3:
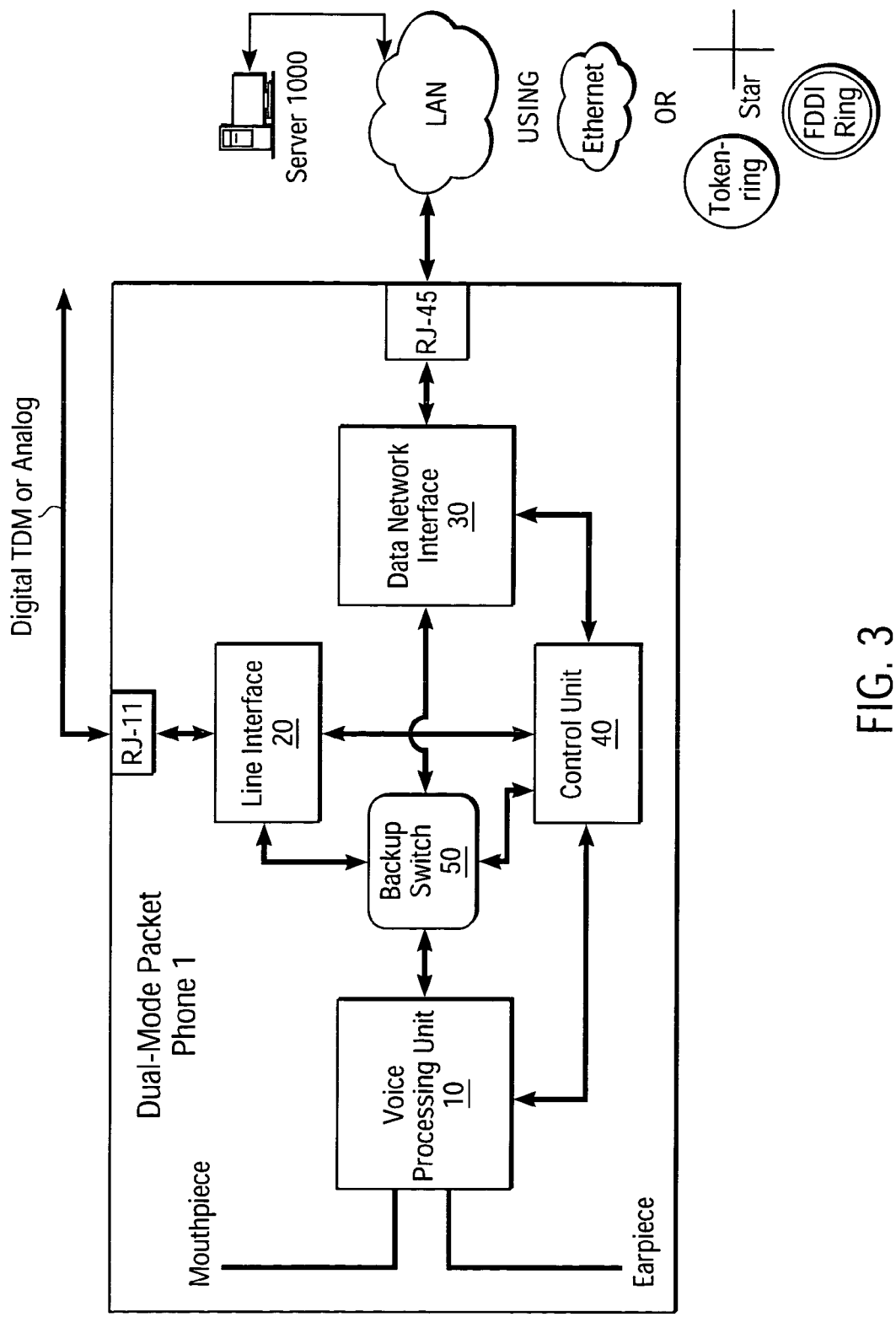
FIG. 3 is a block diagram depicting a preferred embodiment of a dual mode packet phone and its connections.

FIG. 3 depicts an exemplary architecture for dual mode packet phone 1. The main components of the phone are:

1. Voice Processing Unit 10, which takes input from the mouthpiece for transmission of voice information and sends input to the earpiece for reception of voice information.
2. Line Interface 20, which interfaces with the hardware digital TDM or analog cable and the backup data line or the analog line, through the RJ-11 connector.
3. Data Network Interface 30, which interfaces with the Ethernet cable and the LAN, through the RJ-45 connector.
4. Control unit 40, which typically has logic and/or a microprocessor and provides control signals to the other components listed above and to Backup Switch 50, thereby determining whether the phone will be operating in normal mode (e.g., though the Ethernet) or in backup mode (e.g., through the digital TDM or analog line).

Voice Processing Unit 10 processes outgoing voice information into packets and decodes incoming voice information packets, in any manner well known to those in the art of telephony. In the 7-layer ISO (International Standards Organization) OSI (Open Systems Interconnect) model, the Voice Processing Unit 10 manages the voice layer (i.e., Layer 7). Data Network Interface 30 manages the physical layer such as the Ethernet cable (Layer 1), and the hardware data layer including the routers, switches and servers 1000 of the LAN (Layer 2), while the Control Unit 40 manages layers 3 through 7 of the ISO OSI model.

The circuitry for each these components can be implemented in many ways by one of ordinary level of skill in the art without undue experimentation, and accordingly, need not be detailed in this specification.

However, what is important in the preferred embodiment of the invention is that the Control Unit 40 monitors transmitted and/or received signals from the Data Network Interface 30, such that if return signals from any of the various layers of the ISO OSI model are not received within predetermined time periods, the control unit sends a signal to Backup Switch 50 to change the communications channel from the RJ-45 jack to the RJ-11 jack. In this manner, the digital TDM or analog line is activated, sending an off-hook signal to the PBX or Backup Unit, respectively, in the embodiments shown in FIGS. 1b and 2b, or to the Public Network in the examples shown in FIGS. 1a and 2a. In the embodiments of FIGS. 1b and 2b, this off-hook signal causes the PBX or Backup Unit to throw a relay to the appropriate analog trunk lines so that the call can be made using the PSTN (or to such other lines so that the call can be made over the Internet), while in the embodiments shown in FIGS. 1a and 2a, the dedicated lines are in place for making the call via the backup network.

In a preferred embodiment, these time periods are configurable and can be set by a network administrator. Alternatively, pre-determined or default time periods can be provided in the control unit.

The time periods for invoking the backup network could vary depending on the layer being monitored and the mean expected time for a response. So, for example, a different time period, t1, without a response may indicate that there is no power or no signal on the Ethernet Cable (Layer 1 issues) coming in to the Control Unit 40 through the Data Network Interface 30, while a different time period, t2, without a response may indicate that there are no Ethernet frames coming into the LAN or that there are no such frames coming in from the specific address of the server(s) 1000 (Layer 2 issues). Other examples of data network failures could appear in the software layers, such as no IP packets coming in through the server 1000 or router or no IP packets from the address of the server 1000 during a time period t3, (Layer 3 issues), or no TCP/UDP packets arriving in an appropriate time interval t4 (a Layer 4 issue).

Accordingly, the Control Unit 40 has logic and/or software to evaluate the timeliness of response coming from the data network. If any aspect of the response is not timely, the Control Unit 40 will cause the position of Backup switch 50 to change so that information from Voice Processing Unit 10 is directed to Line Interface 20 rather than Data Network Interface 30. Alternatively, if in the aggregate the response is not timely (e.g., a connection is not made within some period of time, such as 10 to 30 seconds, irrespective of whether or not the individual constraints on t1 through t4 are met,), the Control Unit 40 can also cause the position of the Backup Switch 50 to allow use of the backup network. In a preferred embodiment, the Control Unit 40 will cause the Backup Switch 50 to revert to normal mode after a call is completed in the bypass mode, if the data network becomes available.

Having described preferred embodiments for a dual mode packet phone and systems and methods for using it, it should be understood that the invention is not limited to these embodiments and that persons skilled in the art can make various modifications and variations, which would nevertheless be within the scope of the invention.

For example, individual elements of FIGS. 1 and 2 can be used in different permutations. Thus, while a PBX is shown in connection with the internal analog line 230 and external analog line 290 in FIG. 2b, it would also be within the scope of the invention to use a PBX in connection with the internal analog line 230 but with an external digital line. Similarly, while a Gateway is shown in connection with the external analog line 270 in FIG. 2A and the internal analog line 210 in FIG. 2B, it would also be within the scope of this invention to use a Gateway in connection to a digital line in lieu of the analog line.

As another example, while much reference has been made to an Ethernet-based LAN, other LAN arrangements could be substituted for managing and transmitting packet data for the normal mode of operation of the dual mode packet phone described herein. These alternatives include (but are not limited to), FDDI ring and star networks, in addition to the Token Ring and Fiber Channel protocols referred to above, and other networking systems that currently exist or that will be developed over time.

Similarly, analog PSTN and other backup networks based on various TDM protocols have been discussed, but still other backup network types that currently exist or that will be developed over time can be used.

Finally, a particularly effective dual mode packet phone design has been described, but this, too, can be varied to distribute the computational load differently. By way of example and not limitation, the different logic blocks could be combined, or a general multipurpose microprocessor could be configured to perform the described functionality.

Accordingly, the invention is to be limited only by the appended claims and all equivalents thereto.

We claim:

1. A dual mode packet phone comprising:
   a first connector to connect the phone with a data network, wherein the data network is a digital Voice-over-IP Ethernet network;
   a second connector to connect the phone with a backup network, wherein the backup network is an analog network or a digital time division multiplexing (TDM) network;
   a communications channel to send a communication signal;
   a backup switch to connect the communications channel to the first connector or the second connector; and
   a control unit to monitor a first connection attempt initiated on the data network and, if a response to the first connection attempt is not received within a predetermined time, to control the backup switch to disconnect the communications channel from the first connector and to connect the communication channel to the second connector, wherein the signal causes a relay to connect an external line to either the data network or the backup network.

2. The phone of claim 1 further comprising a data network interface.

3. The phone of claim 1 wherein the first connector is an RJ-45 Ethernet connector.

4. The phone of claim 3 wherein the second connector is an RJ-11 connector.

5. The phone of claim 1 wherein the second connector is in communication with a bypass unit.

6. The phone of claim 1, further comprising a bypass unit and wherein:
   the first connector is an RJ-45 Ethernet connector to a local area network;
   the second connector is an RJ-11 connector to a bypass internal analog line;
   wherein a bypass unit activates the bypass internal analog line through the RJ-11 connector when the bypass unit senses an off-hook condition on said line.

7. The phone of claim 6, further comprising an analog trunk between the bypass unit and a Public Network.

8. The phone of claim 7 further comprising a gateway analog line, and wherein in a normal of operation of the phone, the bypass unit connects the gateway analog line to the analog trunk.

9. The phone of claim 8, wherein the phone shares a set of analog trunks irrespective of whether the gateway analog line or the bypass internal analog line is passing voice information to the bypass unit.

10. The phone of claim 1, further comprising bypass and gateway external analog lines that are dedicated trunk circuits from the PSTN.

11. The phone of claim 1 wherein the TDM network is a standard digital interface.

12. The phone of claim 1 wherein the TDM network uses at least one of ISDN, Optiset, RolmLink, Nortel, or Avaya protocols.

13. The phone of claim 1 further comprising:
 a. a voice processing unit for transmitting and receiving voice signals;
 b. a data network interface in communication with the first connector;
 c. a line interface in communication with the second connector, wherein
 d. a backup switch selectively provide a connection between the voice processing unit and either the line interface or the data network interface, and wherein
 e. a control unit having a bi-directional link with the voice processing unit, the data network interface, the line interface, and the backup switch.

14. The phone of claim 1 wherein the backup network comprises an external analog line to a PSTN.

15. The phone of claim 1 wherein the backup network comprises an internal analog line to a bypass unit.

16. The phone of claim 1, wherein the external line is associated with a PBX.

* * * * *